Dec. 4, 1962　　　　N. RYBERG　　　　3,066,352
MACHINE FOR MANUFACTURING FIBERBOARDS
Filed Aug. 18, 1958

Inventor
Nils Ryberg
by Sommers & Young
Attorneys

United States Patent Office 3,066,352

Patented Dec. 4, 1962

3,066,352
MACHINE FOR MANUFACTURING FIBERBOARDS
Nils Ryberg, Ostermalmsgatan 30, Stockholm, Sweden; Sigurd Waldenstrom, administrator of the estate of Nils Ryberg, deceased
Filed Aug. 18, 1958, Ser. No. 755,463
Claims priority, application Sweden Aug. 30, 1957
5 Claims. (Cl. 18—5)

The present invention relates to a machine for manufacturing a building element in the shape of a board made from straw or similar long fibred vegetable material.

The invention relates more specifically to that class of machines for manufacturing such building elements in which the straw or other fibrous material is forced through an open-ended flat channel of a cross section corresponding to the desired cross section of the board to be manufactured, heat being supplied to the channel for allowing the binding or adhesive effect of the natural adhesives contained in the straw or other fibrous material to release with a resulting improved cohesion between the fibres, a web of flexible material, usually cardboard, being applied to the upper and lower surfaces of the completed fibrous mass to allow it to maintain its dimensions after ejection from the channel.

Hitherto, in such machines, such as that disclosed in my U.S. Patent 2,592,470, of April 8, 1952, the fibrous material is forced through the channel by the action of a reciprocating plunger which introduces a given portion of raw fibrous material at a time into the inlet end of the channel. In order to avoid any tendency of said portion of raw fibrous material from getting stuck in the inlet end of the channel a cross extending knife is provided along the upper edge of the inlet opening of the channel in order in conjunction with the suitably shaped operating end of the plunger to cut the portion in front of the plunger free from any material thereabove. A board manufactured by said known machine will therefore consist of a large amount of short pieces or laminae each extending over the entire width of the board which have no organic interconnection but are held together substantially by the action of the surface covering of the board. This renders the use of surface covering on both surfaces of the board unavoidable and, in addition, the covering should be comparatively strong and thick in order to stiffen the board sufficiently. The board manufactured in the way above outlined suffers from the further drawback that it is hard to work in, as by sawing, due to the tendency of the laminae towards getting loose from each other.

The object of the invention is to provide a machine for manufacturing building boards from straw or similar long fibred vegetable material while avoiding the above said drawbacks.

Another object related to that above stated is to provide a machine having an open-ended board shaping channel and means for continuously feeding the fibrous material into said channel as well as means for uninterruptedly or intermittently forcing the material through said channel while gradually compacting it and causing the fibres to intermingle throughout the entire mass. Thus, a board manufactured by this machine may get such a strength as to keep its shape and dimensions unchanged without the use of any surface covering at all or with the use of but a thin and cheap covering material.

This means considerably reduced costs of manufacture of the board, since a great deal of the total costs depend on the covering material. In such cases where it is desired, as for plastering purposes, to remove the covering on one surface, this can only be done after the board is mounted in its place, in order to prevent the board from falling to pieces in mounting it, as might be the case if the covering were removed before mounting the board. It is thus seen that the invention not only gives a cheaper and stronger product but a product that is better suited for its intended purpose as a building material.

A feature of the invention involves the provision of feed members operating continuously or intermittently inside the board shaping channel or a portion of the length thereof in such a way as also to gradually compact the fibrous material according as it advances along the channel.

A preferred form of feed members may be sets of endless chains guided by slots formed in the lower and upper wall members bounding the open-ended board shaping channel which carry catch means, as pins, for engaging the fibrous material and moving it with them.

After passing through a portion of the length of the channel the chains with their catch means are successively lifted out of the channel.

The section of the board shaping channel may be suited for allowing an uninterrupted supply of fibrous material through the inlet end of the channel as well as a gradual compacting of said material within the channel realized, for instance, by gradually reducing the height of the channel from the inlet end thereof.

Another feature of the invention involves that the lower and upper wall members of the flat channel may be adjusted towards and from each other in order to vary the thickness of the boards in a simple way.

The board shaping channel may be combined with a surface coating channel if it is desired to cover one surface or both of the board with a continuous web of any appropriate material.

With these and other objects in view the invention comprises tthe novel features and combinations of features set forth in the following description and specifically pointed out in the annexed claims.

In the accompanying drawing a preferred form of a machine embodying the invention is shown as an example. In the drawings.

Figure 1:
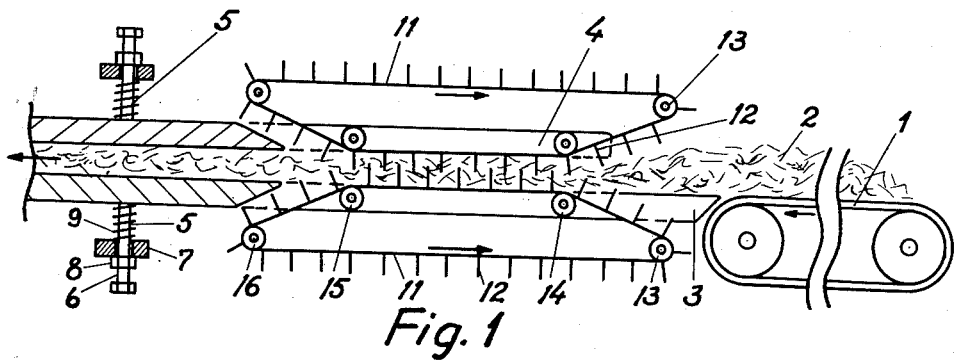
FIG. 1 is a substantially diagrammatic longitudinal section of the machine.

With reference to FIG. 1, the numeral 1 indicates a band conveyor upon which straw or other material 2 is placed in a loose or disordered state, that is, without having been previously arranged in any way. Said material may be distributed by hand or by any appropriate mechanical means as a substantially even layer of desired thickness on the conveyor band. As a direct continuation of the band conveyor 1 there is a flat board shaping channel comprising a lower table section 3 and an upper table section 4 indicated as horizontally arranged in the drawing.

The table sections 3 and 4 are, preferably, heated along a more or less large portion of their length or throughout their entire extension as by electrical heating elements, not shown, and provided with means, as indicated at 5, for adjusting the distance between them. Though there is but a single pair of adjusting elements shown, any required number thereof may be used, suitably distributed along the length of the channel. The type of adjusting element shown comprises a screw 6 extending freely through a hole formed in a fixed bracket 7 and bearing with its end against the respective table section. The screw carries outside of the bracket a nut 8 and is surrounded between the bracket 7 and the respective table section by a helical spring 9. The operation of this type of adjusting means is obvious.

The adjusting means are, preferably, individually operable for allowing the table sections 3, 4 or parts thereof to be set into positions with relation to each other in which the channel therebetween will taper more or less in the feeding direction.

Figure 2:
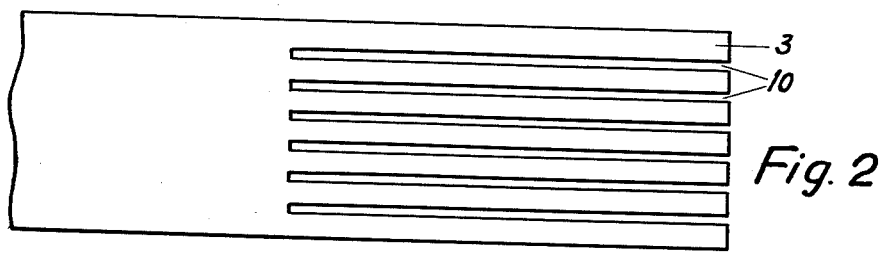
FIG. 2 is a plan view of a table section forming a lower wall member of the board shaping channel shown in FIG. 1.

The table sections 3, 4 are formed along a portion of their length as reckoned from the end facing the band conveyor 1 with a set of longitudinally extending parallel slots 10, as shown in FIG. 2 in respect of the table section 3.

Engaging each slot 10 of the lower table section 3 is an endless chain 11 the upper part of which is on a level with the upper surface of lower table section 3. Similarly, the slots 10 of the upper table section are each engaged by an endless chain 11, the lower part of which is on a level with the lower surface of the upper table section 4.

The endless chains 11 are provided with outwardly projecting pins 12 acting as grippers for the straw or other fibrous material. The pins 12 may, preferably, be exchangeable to suit varying distance between the lower and upper table sections. In FIG. 1 the endless chains are guided by pulleys 13–16. As shown, said pulleys are so positioned that the pins 12 will be gradually moved into engagement with the fibrous material at the inlet end of the channel, that is, to the right in the drawing, and, likewise, at the left hand end of the slotted portions of the table sections. It is to be noted that other suitable arrangement of pulleys or guide rollers may be used.

The arrangement and the dimensions of the chains may, of course, be suited to the requirements in every individual case. Also the pins may be varied as to number, length and so on.

Figure 4:
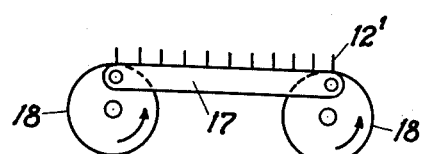
FIG. 4 is a side elevation of a modified feeding device.

In FIG. 4 is shown a modified form of combined feeding and compacting device for cooperation with the lower table section. It comprises an arm or a link 17 supported like a connecting rod by a pair of spaced rotary wheels 18, during the rotation of which the comb like structure as constituted by the link 17 and a set of pins 12' at one longitudinal edge thereof will intermittently enter the slots 10 of the lower table section 3. A similar comb like structure may also be used for the upper table section, though, of course, with the pins pointing downward. It is to be noted that the comb like structure may be arranged so as to allow the pins 12' thereof gradually to enter and leave the channel between the table sections and the fibrous material therein in a way similar to that as above mentioned in respect of the feeding and compacting chains of FIG. 1.

Figure 3:
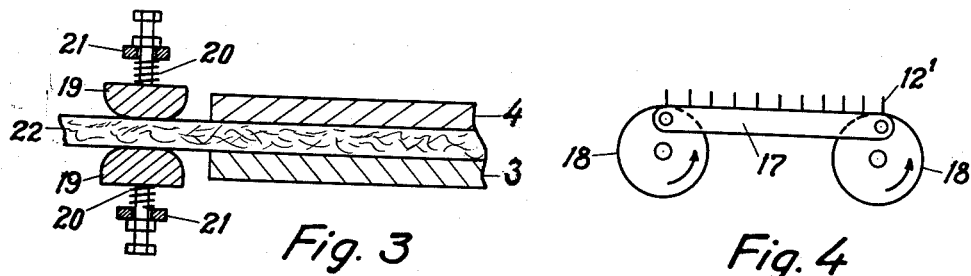
FIG. 3 is a longitudinal section of the delivery end portion of the board shaping channel and two friction elements engaging the finished board for adjusting the speed of delivery of the board from the channel in order to vary its hardness.

In FIG. 3 friction elements are shown for cooperation with the board as it leaves the board shaping channel. Said elements may comprise friction blocks 19 loaded by springs 20 inserted between said blocks and adjustable brackets 21.

In operation, the machine shown in FIG. 1 receives straw or other long fibred raw material from the band conveyor 1 which delivers it to between the table sections 3 and 4 where it is caught by the pins 12 of the lower and upper endless chains 11 and caused to move with the pins on their way through the channel. When the pins are lifted out of the channel the straw in front of the pins will continue its advance through the channel under the action of the mass of straw continually fed by the pins. Due to the resistance to which the material is subjected by the walls of the channel it will be compacted more or less therein so as to leave the channel as a self contained board in which the fibres are thoroughly intermingled so as to secure a uniform hardness of the board. By supplying heat to the table sections the binding or adhesive effect of the natural adhesives contained in the straw or other fibrous material may be allowed to release, and since the fibres of the straw are intermingled throughout the entire mass, there will result a board capable of retaining its dimensions and compact consistency without the use of surface covering.

If for some reason it may be required or desired to use a surface coating on one side or both of the board, such covering may be of arbitrarily thin and cheap material. Such surface covering may be applied by well known means according as the compacted product is delivered from the compacting channel, as for instance, by means similar to those described in my U.S. Patent 2,592,470 above referred to.

Figure 5:
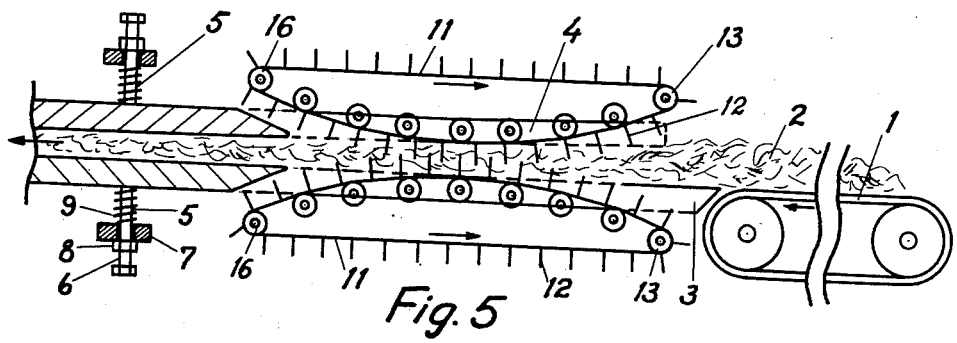
FIG. 5 is a substantially diagrammatic longitudinal section of a modified embodiment of the machine.

In FIG. 5 is shown a modified type of machine in which the upper table section 4 slightly diverges from the lower table section 3 towards the inlet end of the compacting channel. There will thus result a certain compression of the straw or other fibrous material on its way with the pins 12, before reaching the unslotted portion table sections of the channel. In FIG. 5 the operating parts of the chains 11 are moving along arched paths, guided by a large number of guide rollers positioned at small distances apart between the end pulleys 13 and 16. By this means the pins 12 may be allowed smoothly to engage and disengage the fibrous material.

As a further modification a caterpillar type of pressing elements may be used which exert a positive pressure on the fibrous mass while feeding it.

I claim:

1. In a machine for the manufacture of boards from straw, upper and lower wall members forming an open-ended, substantially horizontal shaping channel, said wall members having longitudinally extending slots formed therein along a limited extent of the length of said members beginning at the inlet end of the channel, said slots having open ends at the inlet end of the channel and being bounded by sloping surfaces at their ends remote from the channel inlet, conveying means provided in front of the lower wall member for feeding straw into the channel inlet, upper and lower sets of endless conveyors each entering an individual one of said slots, catch members on said conveyors for engaging the straw in the channel and moving it away from the inlet end thereof, guide means in combination with each endless conveyor comprising means at the inlet and means at the outlet of said shaping channel for guiding the catch members in gradually sloping paths into the shaping channel at the inlet end thereof and guiding the catch members in reversely gradually sloping paths along the sloping rear end wall of the respective slots out of the shaping channel, while moving in the direction away from the inlet of the channel along the distance between said sloping paths.

2. A machine as claimed in claim 1, and in which the distance between the slotted portions of the upper and lower wall members gradually increases towards the inlet end of said channel.

3. A machine as claimed in claim 1, and in which the distance between the slotted portions of the upper and lower wall members are uniform towards the inlet end of said channel.

4. A machine for the manufacture of boards from straw according to claim 1 and in which said guide means at said inlet and at said outlet of said channel are spaced apart longitudinally of the direction of extent of said channel and said conveyors extend freely between said inlet and outlet guide means and therefore move in a substantially straight lines therebetween.

5. A machine for the manufacture of boards from straw according to claim 1 and in which, between the guide means at said inlet and at said outlet of said shaping channel, additional guides are provided extending in inwardly convex curved guide paths whereby said conveyors move in said curved guide paths between said inlet and outlet guide means.

References Cited in the file of this patent

UNITED STATES PATENTS

| | | |
|---|---|---|
| 2,369,488 | Perry | Feb. 13, 1945 |
| 2,717,420 | Roy | Sept. 13, 1955 |
| 2,728,939 | Behr | Jan. 13, 1956 |
| 2,737,997 | Himmelheber et al. | Mar. 13, 1956 |

FOREIGN PATENTS

| | | |
|---|---|---|
| 1,011,675 | France | Apr. 9, 1952 |
| 1,038,008 | France | May 6, 1953 |
| 554,198 | Italy | Jan. 7, 1957 |